June 3, 1952 V. HUDELEY 2,599,454
STRUCTURAL PHOTOGRAPHIC ARRANGEMENT FOR
OBTAINING THREE-DIMENSIONAL IMAGES
Filed Oct. 18, 1948 2 SHEETS—SHEET 1
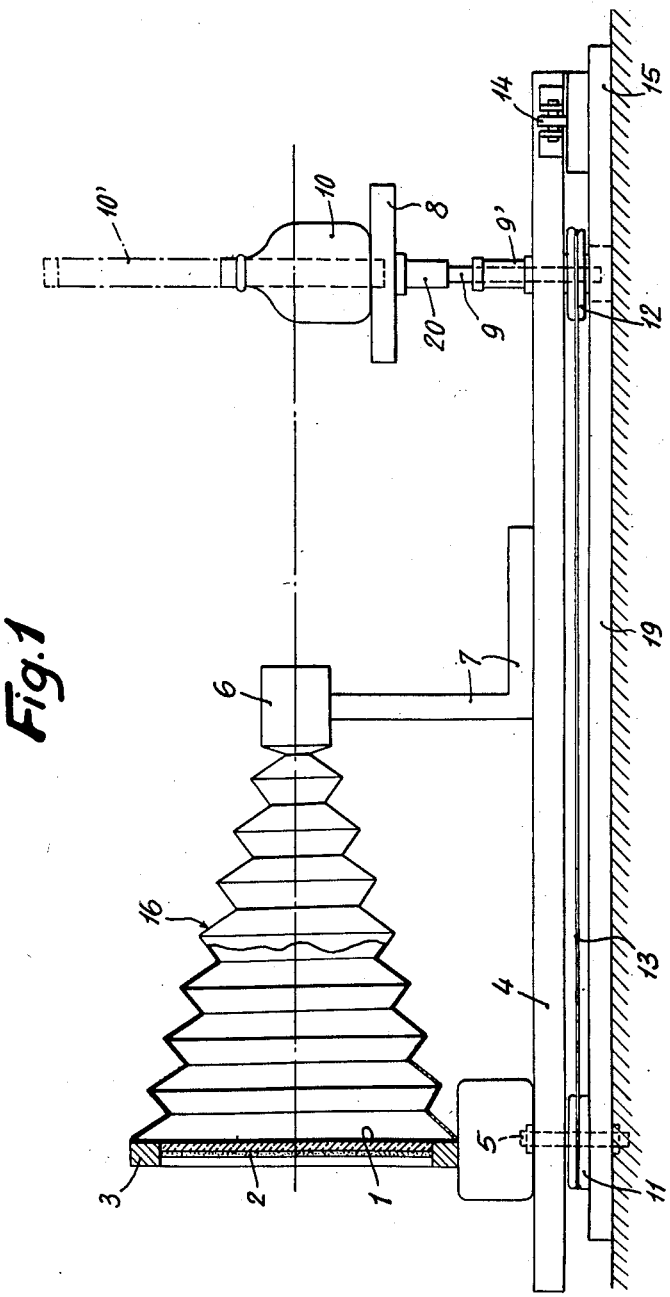
INVENTOR
VICTOR HUDELEY
By Linton and Linton
ATTORNEYS June 3, 1952 V. HUDELEY 2,599,454
STRUCTURAL PHOTOGRAPHIC ARRANGEMENT FOR
OBTAINING THREE-DIMENSIONAL IMAGES
Filed Oct. 18, 1948 2 SHEETS—SHEET 2
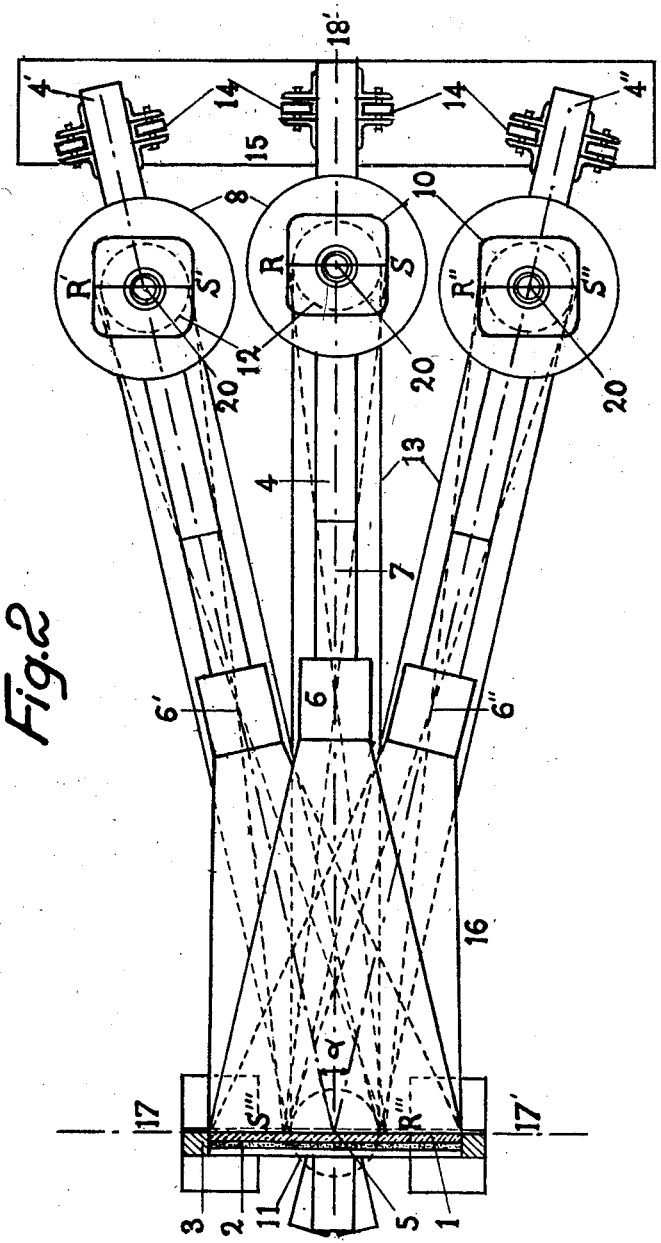
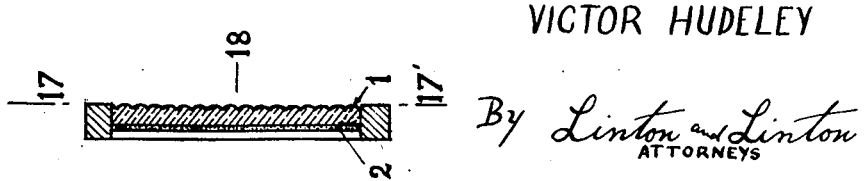
INVENTOR
VICTOR HUDELEY
By Linton and Linton
ATTORNEYS Patented June 3, 1952

2,599,454

UNITED STATES PATENT OFFICE 2,599,454

STRUCTURAL PHOTOGRAPHIC ARRANGEMENT FOR OBTAINING THREE-DIMENSIONAL IMAGES

Victor Hudeley, Clichy, France

Application October 18, 1948, Serial No. 55,133
In France October 23, 1947

6 Claims. (Cl. 95—18)

1

The present invention relates to a novel and improved structural arrangement or apparatus for obtaining photographic images giving the impression of depth or stereoscopic relief, and adapted for the taking of such three-dimensional photographic views of inanimate or other objects.

It is an object of this invention to provide an improved photographic apparatus of the above character which will be efficient and reliable in operation, and yet of simple and rugged construction involving comparatively moderate costs.

An essential characteristic feature of this invention is constituted by the fact that the frame supporting the plurality of vertically disposed cylindrically-shaped lenticulations and the sensitive coating layer is the sole member which is adapted to remain in a stationary position during the registration exposure whereas the object under process of being photographed, or the virtual image of the latter which may be substituted thereto, is caused to be displaced in a combined double motion, both circular uniform with respect to the lenticulations and rotatory about a vertical axis substantially through its centre; in other words, the said object, or the virtual image thereof, is displaced along an arc of a circle and at the same time is rotated in a reverse direction about a distinct axis in such a way that the two rotation angles are equivalent thus cancelling each other whereby the combined resultant motion is in the form of a curvilinear translation.

In order that this invention may be readily understood and carried into effect, reference will be had more in details to the accompanying drawings wherein like characters are employed to indicate like parts in the several views and which show by way of example two distinct constructional forms according to this invention.

In the drawings:

Fig. 1 illustrates diagrammatically an elevational view of a structural arrangement for obtaining three-dimensional images of inanimate objects, Fig. 2 is a plan diagrammatic view illustrating the combined double motion imparted to the object during the process of photographic exposure in the structural arrangement of Figure 1, and Fig. 3 is an enlarged horizontal sectional view of a screen forming a part of the present device.

Referring now to Figure 1, the frame 3 is adapted for supporting the sensitive coating layer 2 disposed behind the screen 1 formed of a vertically disposed structure comprising a plurality of cylindrically-shaped lenticulations arranged side by side (Figure 3) and equally divided by a horizontal plane through the centre of the objective. Pivotally mounted on the upstanding axle 5 rigidly secured to and projecting from the base-plate 19 is the laterally extending arm member 4 adapted to be moved angularly in a horizontal plane and having at its free end a conventional ball bearing such as 14 designed for non-frictional movement upon the track 15. Upon the pivoted arm member 4 is rigidly secured by way of an appropriate bracket 7 the photographic objective 6 of any desired opening, and the said objective is connected to the frame 3 by means of a conventional bellows 16. The object-supporting plate 8 has secured thereto a light-holding frame 10' shown for clarity's sake in broken lines and designed to illuminate the object 10, the aforesaid plate being also carried by the arm member 4 by means of a downwardly projecting cylindrically-shaped extension rod 9 coinciding with the vertical axis 20 of the plate and adapted for rotatable engagement within the upright sleeve 9' integral with the pivoted arm 4. The grooved pulley 11 integral with or rigidly secured to the pivot axle 5 of the arm 4 is connected by means of a suitable endless rope 13 to an identical pulley 12 secured similarly to the upstanding rod 9 thereby causing the latter to rotate and drive the plate together with the light-holding contrivance integral therewith when the arm member 4 is pivotally moved about the axle 5.

In Figure 2, intended to illustrate more in details the combined double motion of the object to be photographed during the process of exposure, the said object is represented as having a horizontal line RS through its centre. Upon movement of the pivoted arm member 4 about the axle 5, which movement causes the object-supporting plate to be rotated due to actuation from pulleys 11 and 12 driving the rod 9, the extreme relative positions of the horizontal line are shown in R'S' and R''S'' respectively. The pulleys 11 and 12 are of identical diameters and therefore the respective vertical planes coinciding with R'S' and R''S'' remain in parallel relationship to the vertical plane coinciding with the line RS; as a result, the image of the latter is maintained stationary and of invariable size within the camera throughout the exposure process in the position indicated in R'''S''' located in the vertical plane 17' tangentially of the lenticular elements. The rotation angle of the object-supporting plate 8 is equal to the pivoting angle of the arm member 4 and consequently likewise equal to the angle field of the lenticular elements.

It will be noted that in both constructional forms as shown in Figures 1 and 2:

The registration objective, of any desired opening, is effectively limited by way of a vertically slotted diaphragm, The motion of the pivoted arm member, the opening and closing of the vertically slotted diaphragm on the objective are operated in response to one sole actuation, regardless of whether or not the photographic registration is effected continuously or intermittently, and The angle field of the lenticular elements determines the amplitude of movement of the pivoted arm member and the resultant combined motion.

It will be clearly understood that the constructional forms described and illustrated in the accompanying drawings are not designed to be of a limitative character and that many changes may be made by those skilled in the art without exceeding the scope of this invention as defined in the appended claims.

I claim:

1. A structural arrangement for obtaining three-dimensional photographic images comprising a stationary frame adapted for carrying a sensitive layer and a screen of vertically disposed lenticular elements, an objective for forming an image of the subject to be photographed on the sensitive layer, means for imparting to the objective and the subject to be photographed a rotary motion about an axis substantially coinciding with the plane of said frame, and means for imparting to the subject to be photographed a rotary motion equal to and in reverse to said rotation of said objective and said subject and about an axis in parallel relationship to the former and through its centre.

2. A structural arrangement for obtaining three-dimensional photographic images comprising a stationary frame adapted for carrying a sensitive layer and a vertical screen of lenticular elements, a support pivoting about a vertical axis located substantially in the plane of the frame, a photographic objective having a horizontal optical axis and carried on said pivoted support, a plate carried on said support adapted to receive the subject to be photographed, and means to rotate said plate on said support about a vertical axis meeting the optical axis of said photographic objective with a rotation equal to and in reverse to the rotation of said support.

3. A structural arrangement for obtaining three-dimensional photographic images as claimed in claim 2 comprising a first pulley rigidly secured on the pivot axis of said support, a second pulley of the same diameter as said first pulley and integral with said plate and an endless rope wound on the two pulleys.

4. A structural arrangement for obtaining three-dimensional photographic images as claimed in claim 2 in which the pivot axis of the support coincides with the intersection of the vertical plane tangent to the lenticular elements and the vertical plane coincident to the optical axis of the objective and comprising a running track for supporting thereon the end of the support opposite to its pivot axis, two ball bearings carried by said support and adapted for rolling upon said track, an expandible bellows connecting the objective to the frame, a light-holding contrivance carried by said plate, a first pulley keyed to the pivot axle of said support, a second pulley of the same diameter as said first pulley and integral with said plate and an endless rope wound about the two pulleys.

5. A structural arrangement for obtaining three-dimensional photographic images as claimed in claim 1 in which the range of angular displacement of the objective is equal to the field angle of the lenticular elements of the screen.

6. A structural arrangement for obtaining three-dimensional photographic images as claimed in claim 1 in which the objective has a vertically slotted diaphragm.

VICTOR HUDELEY.

REFERENCES CITED

The following references are of record in the file of this patent:

UNITED STATES PATENTS

| Number | Name | Date |
| --- | --- | --- |
| 2,002,090 | Ives | May 21, 1935 |
| 2,150,932 | McDonnell | Mar. 21, 1939 |

FOREIGN PATENTS

| Number | Country | Date |
| --- | --- | --- |
| 590,853 | France | Mar. 26, 1925 |